(12) United States Patent
Gamble et al.

(10) Patent No.: US 10,933,996 B2
(45) Date of Patent: Mar. 2, 2021

(54) RELEASE AND CAPTURE OF A FIXED-WING AIRCRAFT

(71) Applicants: Dustin Gamble, San Luis Obispo, CA (US); Matthew Curran, San Luis Obispo, CA (US)

(72) Inventors: Dustin Gamble, San Luis Obispo, CA (US); Matthew Curran, San Luis Obispo, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 1036 days.

(21) Appl. No.: 14/816,318

(22) Filed: Aug. 3, 2015

(65) Prior Publication Data
US 2017/0036762 A1    Feb. 9, 2017

(51) Int. Cl.
*B64D 5/00*         (2006.01)
*B64C 27/08*      (2006.01)
*B64C 39/02*      (2006.01)

(52) U.S. Cl.
CPC ............... *B64D 5/00* (2013.01); *B64C 27/08* (2013.01); *B64C 39/024* (2013.01); *B64C 2201/024* (2013.01); *B64C 2201/082* (2013.01); *B64C 2201/108* (2013.01); *B64C 2201/12* (2013.01); *B64C 2201/182* (2013.01); *B64C 2201/206* (2013.01)

(58) Field of Classification Search
CPC ..... B64D 5/00; B64C 27/08; B64C 2201/206; B64C 2201/182; B64C 2201/082; B64C 2201/024
See application file for complete search history.

(56) References Cited

U.S. PATENT DOCUMENTS

| 2,653,777 A | 9/1953 | Barkey |
| 2,843,337 A | 7/1958 | Bennett |
| 2,921,756 A * | 1/1960 | Borden .................... B64D 5/00 244/2 |
| 3,291,242 A | 12/1966 | Tinajero |

(Continued)

FOREIGN PATENT DOCUMENTS

| EP | 3 090 946 A1 | 11/2016 |
| JP | 2007535438 | 12/2007 |
| WO | WO 2016/167849 A1 | 10/2016 |

OTHER PUBLICATIONS

KIPO's Notice of Preliminary Rejection; Korean patent appln No. 10-2016-0097758; 6 pages including translation, dated May 28, 2020.

(Continued)

*Primary Examiner* — Brian M O'Hara
*Assistant Examiner* — Keith L Dixon
(74) *Attorney, Agent, or Firm* — Baker Botts L.L.P.

(57) ABSTRACT

In one embodiment, a system includes an unmanned, multirotor helicopter and a fixed-wing aircraft. The multirotor helicopter may couple to the fixed-wing aircraft to support and hold the fixed-wing aircraft. The multirotor helicopter may then elevate the fixed-wing aircraft from a launch site to a release altitude. The multirotor helicopter may also accelerate the fixed-wing aircraft to a release speed and upon reaching the release speed, release the fixed-wing aircraft. The unmanned, multirotor helicopter may then return to the launch site.

5 Claims, 4 Drawing Sheets

(56) References Cited

U.S. PATENT DOCUMENTS

| | | | | |
|---|---|---|---|---|
| 3,568,953 | A * | 3/1971 | Beezley | B64C 29/00 244/2 |
| 4,267,987 | A * | 5/1981 | McDonnell | B64D 5/00 244/137.4 |
| 4,678,141 | A | 7/1987 | Sarrantonio | |
| 4,757,959 | A | 7/1988 | Schroder et al. | |
| 5,000,398 | A * | 3/1991 | Rashev | B64C 27/08 244/110 E |
| 5,465,923 | A * | 11/1995 | Milner | B64C 37/02 244/131 |
| 8,038,090 | B2 | 10/2011 | Wilson et al. | |
| 8,418,959 | B2 | 4/2013 | Kang et al. | |
| 8,528,853 | B2 | 9/2013 | Luther | |
| 8,740,134 | B2 | 6/2014 | Suzuki | |
| 8,864,069 | B2 | 10/2014 | McDonnell | |
| 8,925,857 | B2 | 1/2015 | Luther | |
| 8,950,698 | B1 * | 2/2015 | Rossi | B64C 37/02 244/2 |
| 8,973,860 | B2 | 3/2015 | Beard | |
| 9,010,690 | B1 * | 4/2015 | Al-Heraibi | B64D 17/00 244/100 R |
| D732,458 | S * | 6/2015 | Dutertre | D12/319 |
| 9,359,075 | B1 * | 6/2016 | von Flotow | B64D 5/00 |
| 9,527,392 | B2 * | 12/2016 | Peverill | B64C 39/024 |
| 9,561,852 | B1 * | 2/2017 | Beaman | B64D 1/00 |
| 9,630,712 | B1 * | 4/2017 | Carmack | B64C 39/024 |
| 9,656,765 | B2 * | 5/2017 | von Flotow | B64F 1/02 |
| 2011/0006151 | A1 | 1/2011 | Beard | |
| 2011/0127378 | A1 | 6/2011 | McDonnell | |
| 2014/0117147 | A1 | 5/2014 | Hanna et al. | |
| 2015/0115096 | A1 | 4/2015 | Rossi | |

OTHER PUBLICATIONS

EPO Communication and extended European search report re Application No. 16179595.0, dated Dec. 15, 2016.
Japan Notice of Reason for Rejection; JP patent appln No. 2016-152675; 6 pages including translation. dated Jun. 25, 2020.
Korean Patent Application No. 10-2016-0097758, Notice of Final Rejection with English translation.

* cited by examiner

RELEASE AND CAPTURE OF A FIXED-WING AIRCRAFT

TECHNICAL FIELD

This disclosure generally relates to aircraft logistics and, more specifically, to the release and capture of a fixed-wing aircraft.

BACKGROUND

Fixed-wing aircraft perform a number of commercial, military, and civilian tasks. Once airborne, fixed-wing aircraft are power efficient and effective at cruising for long distances. However, fixed-wing aircraft typically require sufficient runway space to accelerate for takeoff and decelerate for landing.

SUMMARY OF PARTICULAR EMBODIMENTS

In accordance with the present disclosure, disadvantages and problems associated with the release and capture of a fixed wing aircraft may be reduced or eliminated.

In one embodiment, a system includes an unmanned, multirotor helicopter and a fixed-wing aircraft. The multirotor helicopter may be configured to couple to the fixed-wing aircraft to support and hold the fixed-wing aircraft. The multirotor helicopter may then elevate the fixed-wing aircraft from a launch site to a release altitude. The multirotor helicopter may also accelerate the fixed-wing aircraft to a release speed and upon reaching the release speed, release the fixed-wing aircraft. The unmanned multirotor helicopter may then return to the launch site.

In an example embodiment, a method includes coupling an unmanned, multirotor helicopter to a fixed-wing aircraft. The method may further include elevating the fixed-wing aircraft from a launch site to a release altitude and accelerating the fixed-wing aircraft to a release speed. Upon reaching the release speed, the method may include releasing the fixed-wing aircraft from the unmanned, multirotor helicopter. The method may then include returning the multirotor helicopter to the launch site.

Technical advantages of certain embodiments may include allowing for the removal of extraneous equipment, such as landing gear, from a fixed-wing aircraft. By relying on a multirotor helicopter to release and capture the fixed-wing aircraft, the fixed-wing aircraft may be lighter and more fuel efficient, allowing for longer flight times and/or additional payload. Another advantage provided by the release and capture system may allow for a reduction in the area needed to launch and land the fixed-wing aircraft, thereby expanding the conditions and operations where the aircraft may be utilized (e.g., from helipads, small, uneven tracts of land, and buildings). Still other advantageous may include reducing the damage inflicted on fixed-wing aircraft committed by launcher devices and net retrieval systems.

Other technical advantages will be readily apparent to one skilled in the art from the following FIGURES, descriptions, and claims. Moreover, while specific advantages have been enumerated above, various embodiments may include all, some, or none of the enumerated advantages.

DESCRIPTION OF EXAMPLE EMBODIMENTS

To facilitate a better understanding of the present disclosure, the following examples of certain embodiments are given. The following examples are not to be read to limit or define the scope of the disclosure. Embodiments of the present disclosure and its advantages are best understood by referring to FIGS. 1 through 4, where like numbers are used to indicate like and corresponding parts.

Unmanned, fixed-wing aircraft perform a number of commercial, military, and civilian tasks. For example, the military may utilize fixed-wing aircraft to perform long-range reconnaissance missions, while farmers may rely on autonomous aircraft to survey large tracts of land. These aircraft may fly autonomously or be remote controlled by a pilot. Once airborne, fixed-wing aircraft are power efficient and effective at cruising for long distances. However, fixed-wing aircraft require sufficient runway space to accelerate for takeoff and decelerate for landing.

A number of runway-independent techniques have attempted to overcome the issues presented by limited runway space. For example, a rail launcher may quickly propel an aircraft into the air while a net or other reception device may capture the aircraft as it returns. However, rail launchers are bulky and difficult to deploy. Furthermore, when returning at flight speed, the net system may damage the aircraft as the aircraft flies into the net at higher speeds.

To utilize the benefits of fixed-wing aircraft while operating with limited runway space, embodiments of the present disclosure utilize an unmanned, multirotor device, such as a helicopter, to lift the fixed-wing aircraft into sky, accelerate with the aircraft until reaching a release speed, at which point the multirotor helicopter may release the aircraft and return to the launch area. To capture the fixed-wing aircraft, the multirotor device may again climb to a cruising altitude of the aircraft, transition to the cruising speed of the aircraft, reconnect to the aircraft, decelerate to a hover, and descend to the launch site. In this manner, a fixed-wing aircraft may launch and land from any location, regardless of whether a runaway is available.

Using a multirotor helicopter to release and capture a fixed-wing aircraft provides a number of technical advantages not realized by current systems. Certain embodiments of the disclosure may allow for the removal of extraneous equipment, such as landing gear, from the fixed-wing aircraft. This may allow the aircraft to be lighter and more fuel efficient. Removing extraneous equipment may also allow for longer flight times or additional payload. Another advantage may be that certain embodiments allow for a reduction in the area needed to launch and land the fixed-wing aircraft, thereby expanding the conditions and operations where the aircraft may be utilized (e.g., from helipads, uneven tracts of land, and buildings). In addition, some embodiments may reduce the damage inflicted on fixed-wing aircraft committed by launcher devices and net retrieval systems. FIGS. 1-4 provide additional details for the unmanned, multirotor release and capture system that may provide these and other advantages.

Figure 1:
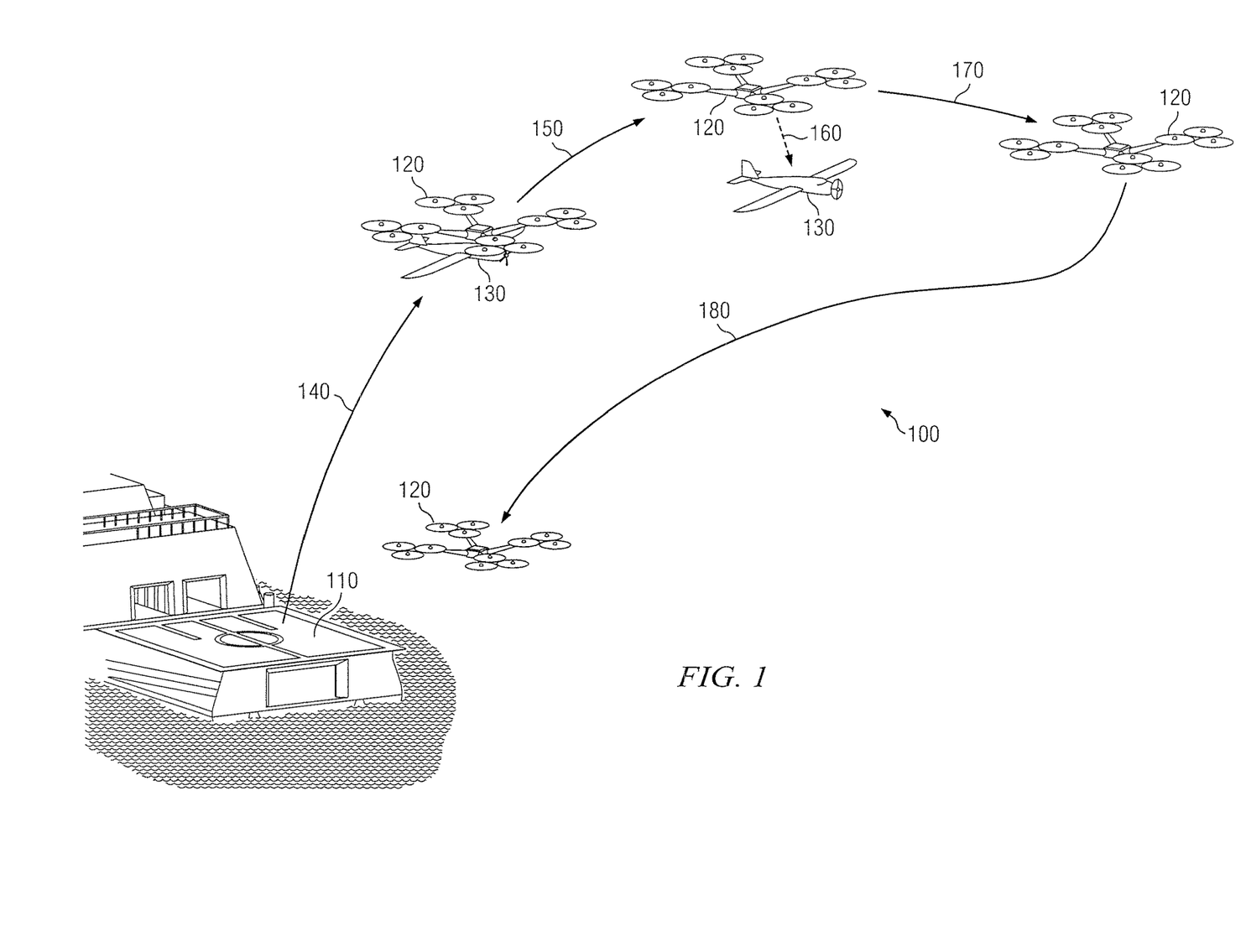
FIG. 1 illustrates an example system for the release of a fixed-wing aircraft using an unmanned, multirotor device according to certain embodiments.

FIG. 1 illustrates an example system 100 for the release of a fixed-wing aircraft 130 using an unmanned, multirotor device 120. In the illustrated embodiment, multirotor device 120 is coupled to fixed-wing aircraft 130 on launch site 110. Launch site 110 represents any suitable location that allows multirotor device 120 to takeoff and/or return with fixed-wing aircraft 130. In some embodiments, launch site 110 may represent an area that cannot accommodate a runway. For example, launch site 110 may be a helipad on a ship, a rooftop of a building, uneven terrain, a heavily populated event, or any other location not suitable for aircraft that require runway space to accelerate for takeoff and decelerate when landing.

To deploy fixed-wing aircraft 130, multirotor device 120 may lift and elevate fixed-wing aircraft 130 to follow combined launch path 140. A number of factors may determine the elevation and direction of combined launch path 140. These factors may include the flight path and mission of fixed-wing aircraft 130, surrounding environmental conditions (e.g., nearby buildings, fences, etc.), regulations (e.g., Federal Aviation Regulations or local ordinances), wind and weather patterns, and design limitations of fixed-wing aircraft 130 and/or multirotor device 120 (e.g., battery capacity, wing span, etc.). Combined launch path 140 may also vary based on the capabilities of multirotor device 120 such as the rate of elevation and lifting capacity.

In an example embodiment, multirotor device 120, coupled to fixed-wing aircraft 130, may takeoff vertically from launch site 110. Multirotor device 120 may climb to a release altitude of 1000 feet at a rate of 500 feet-per-minute (fpm). At the rate of elevation, this may take multirotor device 120 approximately two minutes.

In some embodiments, upon reaching the release altitude multirotor device 120 may transition to a forward direction according to release path 150. In some embodiments, multirotor device 120 may elevate at an angle during combined launch path 140 in the direction of release path 150. Multirotor device 120 may continue accelerating according to release path 150 until reaching a release speed.

Depending on the size and abilities of fixed-wing aircraft 130, multirotor device 120 may accelerate to any suitable release speed that allows fixed-wing aircraft to maintain flight after being released. For example, fixed-wing aircraft 130 may dispense pesticides as an agricultural crop duster. This may require a slower release speed (e.g., 30-40 km/h) than when fixed-wing aircraft 130 is performing long distance reconnaissance missions and needs to cruise at faster speeds (e.g., 100-120 km/h).

In some embodiments, fixed-wing aircraft 130 may utilize its own propulsion system to enhance the acceleration of multirotor device 120. This may decrease the time needed to accelerate to the release speed and may ensure that fixed-wing aircraft 130 is operating at sufficient speeds to maintain flight once released.

Upon reaching the release speed, multirotor device 120 may release fixed-wing aircraft 130 at release position 160. In certain embodiments, multirotor device 120 may travel with fixed-wing aircraft 130 at the release speed but not release fixed-wing aircraft 130 until reaching a certain destination, such as a predetermined coordinate.

At release position 160, multirotor device 120 may initiate the release mechanism to detach fix-winged aircraft 130. In some embodiments, fixed-wing aircraft 130 may initiate the release mechanism instead of multirotor device 120. In certain embodiments, multirotor device 120 and fixed-wing aircraft 130 may coordinate the release sequence to ensure both devices are prepared to work individually upon release.

After releasing fixed-wing aircraft 130, multirotor device 120 may follow post-release path 170. Post-release path 170 may reduce interference between multirotor device 120 and fixed-wing aircraft 130. For example, multirotor device 120 may follow post-release path 170 and elevate away from fixed-wing aircraft 130 to avoid causing downdraft interference with fixed-wing aircraft 130 from the rotors of multirotor device 120.

Following the release of fixed-wing aircraft 130 (and any post-release maneuvers), multirotor device 120 may follow solo return path 180 and return to launch site 110. Although the illustrated embodiment shows multirotor device 120 returning to launch site 110, in some embodiments, multirotor device 120 may return to a different location. For example, in some embodiments, multiple fixed-wing aircraft 130 may need to be deployed. Multirotor device 120 may launch a first fixed-wing aircraft 130 from a first launch site 110 and follow solo return path 180 to a second, different launch site 110 to release a second fixed-wing aircraft 130. In this manner, a single multirotor device 120 may launch multiple fixed wing aircraft from multiple locations.

Figure 2:
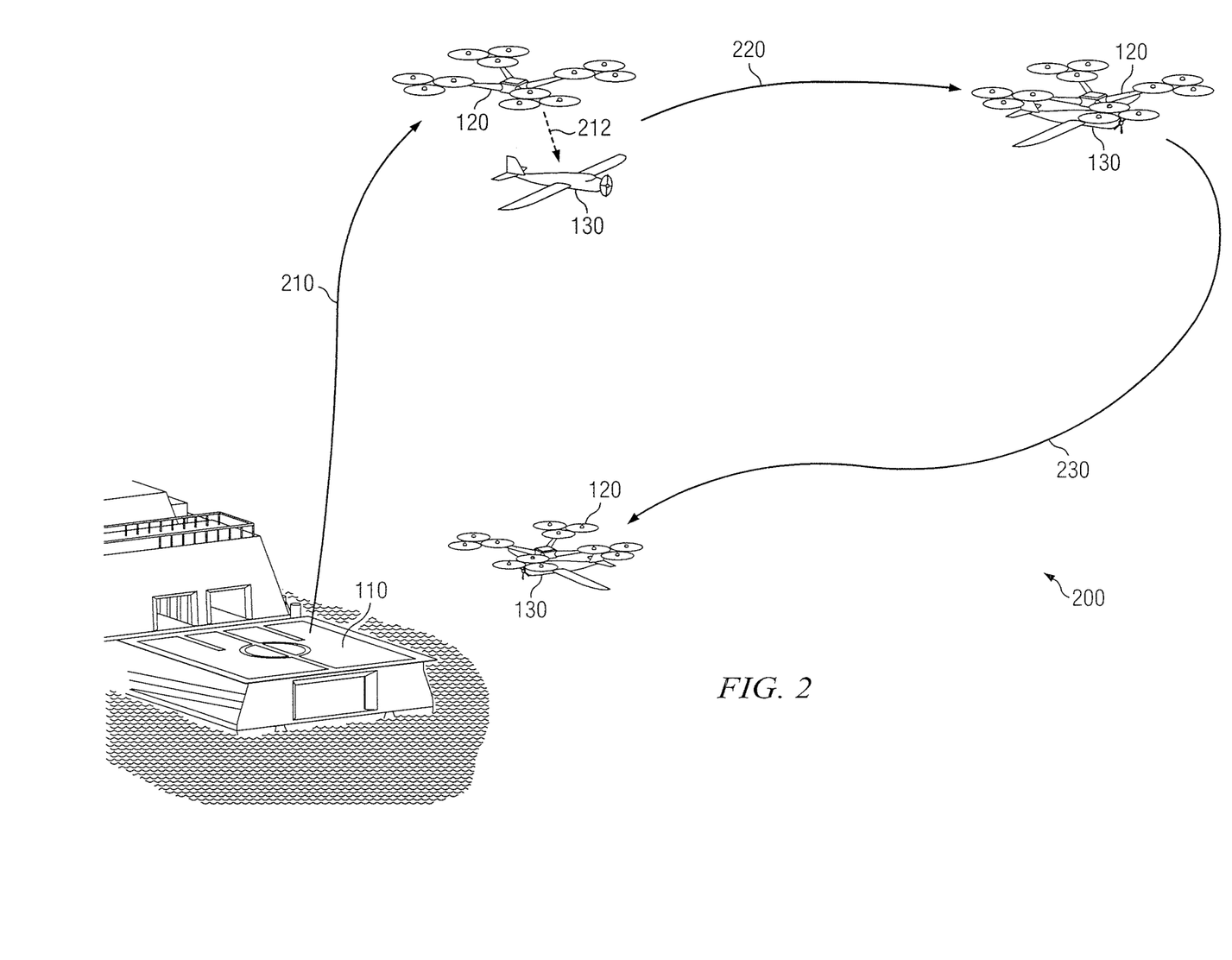
FIG. 2 illustrates an example system for the capture of a fixed-wing aircraft using an unmanned, multirotor device according to certain embodiments.

After returning to launch site 110, multirotor device 120 may idle and/or wait for a signal to capture returning fixed-wing aircraft 130. FIG. 2 illustrates an example system 200 for the capture of fixed-wing aircraft 130 using unmanned, multirotor device 120.

Upon receiving a signal to capture fixed-wing aircraft 130, multirotor device 120 may elevate from launch site 110 according to solo launch path 210. In some embodiments, the signal to capture fixed-wing aircraft 130 may be manually sent from any remote location. In some embodiments, the capture signal may be sent from fixed-wing aircraft 130. For instance, when fixed-wing aircraft 130 is within a predetermined range of multirotor device 120 (e.g., 1, 5, 10 km, etc.) fixed-wing aircraft 130 may communicate a capture signal to multirotor device 120. Multirotor device 120 may then initiate the process of capturing fixed-wing aircraft 130.

In addition to the launch path considerations described in FIG. 1, solo launch path 210 may be influenced by a number of additional factors such as the return distance and heading of fixed-wing aircraft 130, battery life, and the capture mechanism utilized by multirotor device 120. For example, fixed-wing aircraft 130 may be returning from a reconnaissance mission and may be 10 kilometers from launch site 110. Multirotor device 120 may wait until fixed-wing aircraft is within 5 kilometers before initiating its capture sequence based on the available battery power, which may limit flight time.

In some embodiments, multirotor device 120 and fixed-wing aircraft 130 may each comprise a number of sensors and communication devices to coordinate flight paths and couple during flight. Multirotor device 120 and fixed-wing aircraft 130 may use any suitable number of sensors and/or communication devices including, but not limited to GPS processors, navigation and autopilot programming, communication equipment, and signal processors. Additionally, multirotor device 120 and/or fixed-wing aircraft 130 may utilize one or more laser sensors, magnets, and cameras for facilitating the mid-air capture process.

In an example embodiment, multirotor device 120 and fixed-wing aircraft 130 may coordinate capture sequence 212. Any suitable information may be communicated between multirotor device 120 and fixed-wing aircraft 130 including but not limited to capture speeds, capture elevations, and capture vectors. A capture speed may indicate the speed that each device should travel during capture sequence 212. The capture elevation may represent the elevation at which each device should travel at during capture sequence 212. The capture vector may indicate a direction and/or magnitude of travel that each device is flying during capture sequence 212.

The coordination of the capture process between multirotor device 120 and fixed-wing aircraft 130 may be modeled as a master/master, master/slave, or any other suitable communication architecture. For example, in some embodiments, fixed-wing aircraft 130 may act in a master/slave configuration with fixed-wing aircraft 130 directing multirotor device 120. As an illustration, fixed-wing aircraft 130 may send out a capture signal to multirotor device 120 to capture fixed-wing aircraft 130 once fixed-wing aircraft 130 is within 10 km of multirotor device 120. Fixed-wing aircraft 130 may transmit the flight plan for solo launch path 210 and capture path 220. Fixed-wing aircraft 130 may also designate a launch site 110 for multirotor device 120 to return once multirotor device 120 and fixed-wing aircraft 130 are coupled.

In the illustrated embodiment, multirotor device 120 may coordinate a capture sequence 212 defining a specific speed and vector for multirotor device 120 and fixed-wing aircraft 130 to fly. Multirotor device 120 may travel along capture path 220 accelerating or decelerating to a capture speed as indicated by capture sequence 212. For example, multirotor device 120 may fly at an elevation above fixed-wing aircraft 130 until both devices have synchronized vectors and speeds. Multirotor device 120 may then descend in elevation and connect with fixed-wing aircraft 130 using, for example, one or more laser sensors, magnetic couplers, hooks, and/or cameras.

Multirotor device 120 and fixed-wing aircraft 130 may utilize any suitable devices to facilitate the coupling and capture of multirotor device 120 to fixed-wing aircraft 130. For example, in some embodiments, multirotor device 120 and fixed-wing aircraft may be specifically tailored to couple to one another (e.g., using male-female connectors). In some embodiments, multirotor device 120 may have a universal capture mechanism to capture fixed-wing aircraft 130. For instance, multirotor device 120 may have adjustable grappling arms to latch onto the wings of fixed-wing aircraft 130 and/or to the fuselage of fixed-wing aircraft 130. In this manner, multirotor device 120 may capture a range of fixed-wing aircraft 130 models having varying wing-spans, widths, and sizes.

Once multirotor device 120 captures fixed-wing aircraft 130, multirotor device 120 may then decelerate the two devices and descend back to launch site 110 along combined return path 230. In some embodiments, multirotor device 120 may capture fixed-wing aircraft 130 and decelerate along combined return path 230 until reaching a hover. Multirotor device 120 may then descend down onto launch site 110. In some embodiments, fixed-wing aircraft 130 may utilize its propulsion system to aid in the deceleration process. In this manner, multirotor device 120 and fixed-wing aircraft 130 may both return to launch site 110 in a controlled and safe manner.

Modifications, additions, or omissions may be made to systems 100 and 200 without departing from the scope of the disclosure. In some embodiments, multirotor device 120 may be controlled by a pilot in a remotely located control area. In some embodiments, multirotor device 120 may operate autonomously to release and/or capture fixed-wing aircraft 130. For example, multirotor device 120 may follow a preprogrammed combined launch path 140 and climb to a specific elevation at a specific rate of speed. Multirotor device 120 may then release fixed-wing aircraft 130 and return to launch site 120 according to an autopilot program.

As another example, to maximize the locations were fixed-wing aircraft 130 may operate, in certain embodiments fixed-wing aircraft 130 may include landing gear to utilize runways when available and rely on multirotor device 120 if runways are unavailable. This may be beneficial if fixed-wing aircraft 130 is launching from a first location having sufficient area for a runway but traveling to a second location that cannot support a runway (or vice versa). Thus, the second location may still rely on and utilize fixed-wing aircraft 130 based on the capture and release capabilities of multirotor device 120.

Figure 3A:
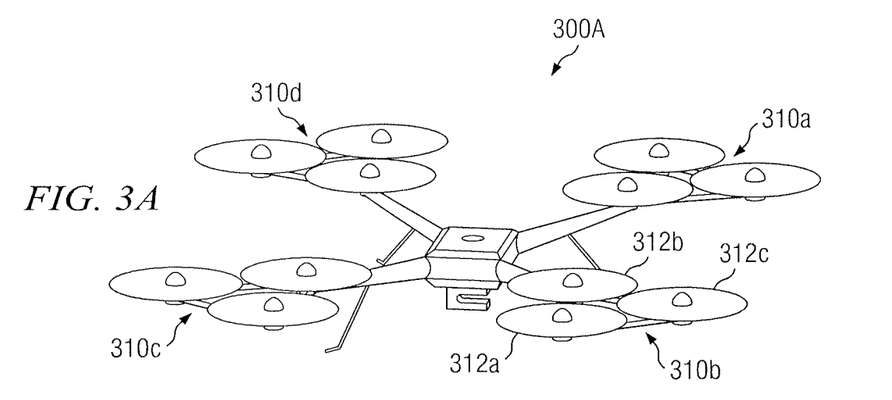
FIGS. 3A-C illustrate perspective views of an unmanned, multirotor device according to certain embodiments.
Figure 3B:
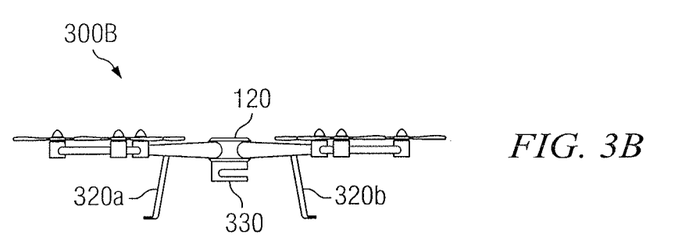
Figure 3C:
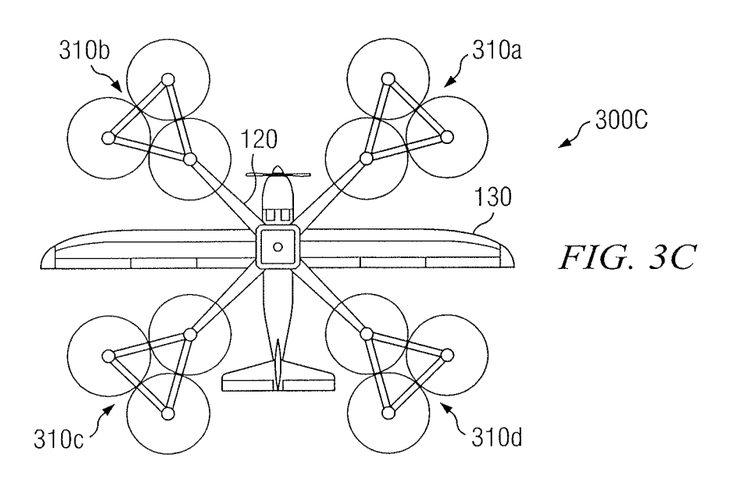

FIGS. 3A through 3C illustrate perspective views of an unmanned, multirotor device 120 according to certain embodiments. FIG. 3A is an illustration of multirotor device 120 showing an example embodiment of propeller clusters 310a-310d (collectively "propeller clusters 310"). In the illustrated embodiment, multirotor device 120 has four sets of propeller clusters 310a-310d for flying and maneuvering. Each propeller cluster 310 may have one or more rotors 312a-312c (collectively "rotors 312"). In the illustrated embodiment, each propeller cluster 310 has three rotors 312.

In some embodiments, propeller clusters 310 may be fixed-pitch blades that may each be independently controlled to control flight speed and direction. In some embodiments, propeller clusters 310 may have a variable-pitch to control the vertical acceleration and climb rates. Although illustrated with four propeller clusters 310 each having three rotors 312, multirotor device 120 may have any suitable number of propeller clusters 310 and/or rotors 312 per cluster.

For example, multirotor device 120 may have four propeller clusters 310 with each propeller cluster having a single rotor. In some embodiments, multirotor device 120 may have additional propeller clusters 310 depending on the control requirements of multirotor device 120.

FIG. 3B illustrates a front view of multirotor device 120. FIG. 3B shows multirotor device 120 with landing supports 320a-320b and a coupling mechanism 330.

Landing supports 320a and 320b (collectively "landing supports 320") may allow multirotor device 120 to land and/or takeoff from launch site 110 without requiring fixed-wing aircraft 130 to use landing gear. For example, landing supports 320 may be sufficiently long in length to support both multirotor device 120 and fixed-wing aircraft 130 when stationary on launch site 110. In some embodiments, supports 320 are retractable and only deploy when multirotor device 120 lands on launch site 110. When flying, multirotor device 120 may retract supports 320 to improve aerodynamics.

Coupling mechanism 330 represents any mechanism suitable for capturing and supporting fixed-wing aircraft 130. As described in FIGS. 1 and 2, coupling mechanism allows multirotor device 120 to capture fixed-wing aircraft 130 midair and transport fixed-wing aircraft 130 to launch site 110. In some embodiments, coupling mechanism 330 may include a number of hooks and latches to secure multirotor device 120 to fixed-wing aircraft 130. In some embodiments, coupling mechanism 330 may include one or more laser sensors, magnets, and cameras to monitor the distance and coupling between multirotor device 120 and fixed-wing aircraft 130.

FIG. 3C illustrates a top view of multirotor device 120 coupled to fixed-wing aircraft 130. In the illustrated embodiment, propeller clusters 310 are positioned in between each wing and the fuselage of fixed-wing aircraft 130. For example, propeller cluster 310a and 310b are positioned in front of the wings and on either side of the fuselage of fixed-wing aircraft 130. Propeller cluster 310c and 310d are behind the wings and on either side of the fuselage of fixed-wing aircraft 130. Positioning propeller clusters 310a-310c in areas away from fixed-wing aircraft 130 may improve flight efficiency and reliability by limiting downdraft interference when multirotor device 120 is coupled to fixed-wing aircraft 130.

In addition to propeller clusters 310, rotors 312, landing supports 320, and coupling mechanism 330, multirotor device 120 may include any suitable power supply. For example, multirotor device 120 may be battery powered through a rechargeable and/or replaceable battery system.

Modifications, additions, or omissions may be made to systems 300 without departing from the scope of the disclosure. For example, some embodiments of multirotor device 120 may have a single rotor for flying to release and capture fixed-wing aircraft 130.

A component of multirotor device 120 and/or fixed-wing aircraft 130 may include an interface, logic, memory, and other suitable elements. An interface receives input, sends output processes the input and/or output, and performs other suitable operations. An interface may comprise hardware and software. Logic performs the operation of the component. For example, logic executes instructions to generate output from input. Logic may include hardware, software and other logic. Logic may be encoded in one or more non-transitory, tangible media, such as a computer readable medium or any other suitable tangible medium, and may perform operations when executed by a computer. Certain logic, such as a processor, may manage the operation of a component. Examples of a processor include one or more computers, one or more microprocessors, one or more applications, and other logic.

Figure 4:
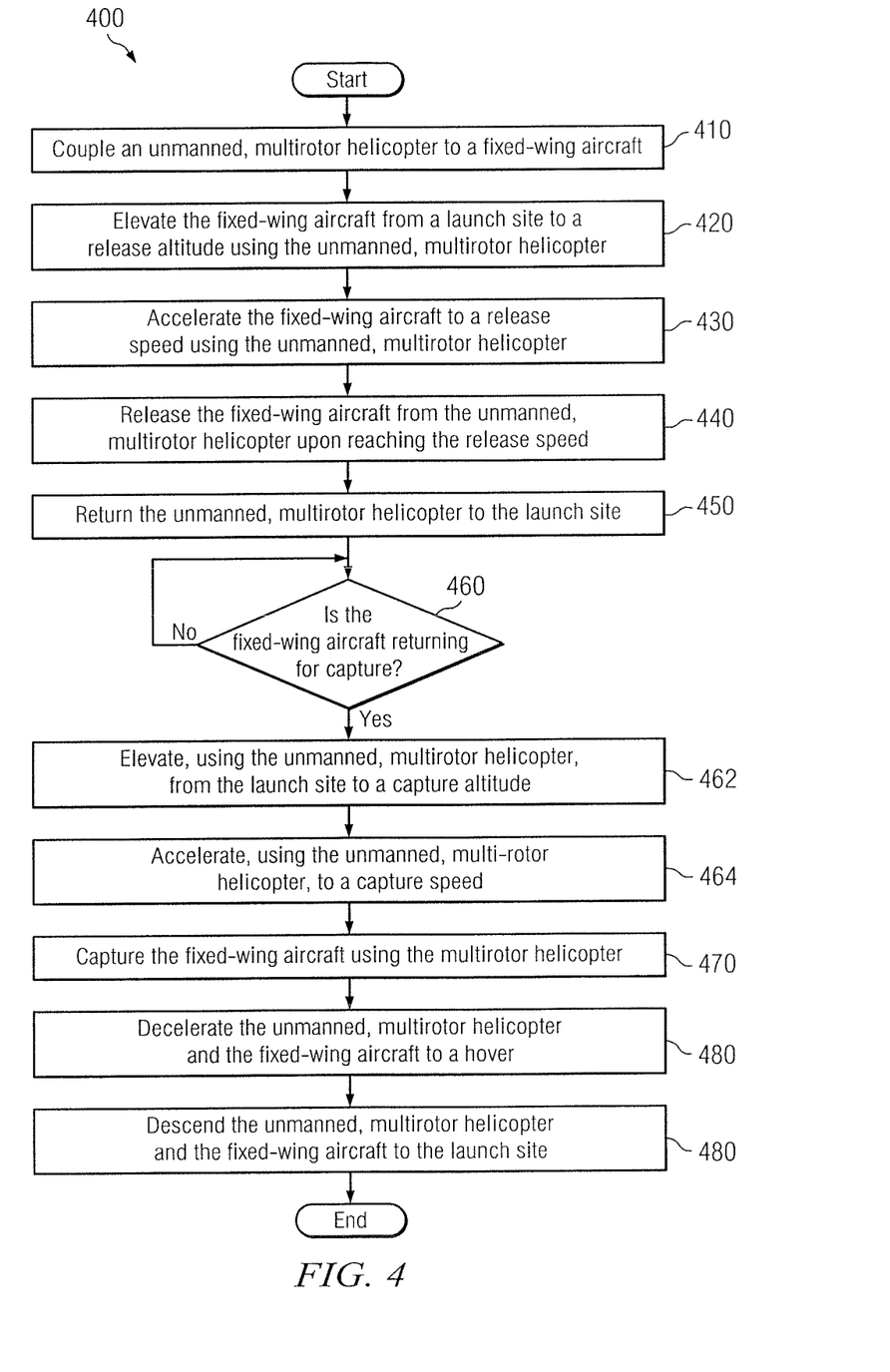
FIG. 4 illustrates a diagram of an example method for releasing and capturing a fixed-wing aircraft using an unmanned, multirotor device according to certain embodiments.

FIG. 4 illustrates a diagram of an example method 400 for releasing and capturing fixed-wing aircraft 130 using unmanned, multirotor device 120. At step 410, unmanned, multirotor device 120 is coupled to fixed-wing aircraft 130. Multirotor device 120 and fixed-wing aircraft 130 may be stationed on launch site 110 waiting to be deployed.

At step 420, multirotor device 120 may elevate fixed-wing aircraft 130 from launch site 110 to a release altitude. In some embodiments, multirotor device 120 initiates the elevation process upon receiving a release signal from fixed-wing aircraft 130 to deploy fixed-wing aircraft 130. Upon receiving the release signal, multirotor device 120 may follow combined launch path 140. At step 430, multirotor device 120 accelerates fixed-wing aircraft 130 to a release speed. Multirotor device 120 may accelerate along release path 150 while also climbing to a predetermined release altitude (e.g., 1000 ft.). In some embodiments, fixed-wing aircraft assists in the acceleration to release speed by utilizing its own propulsion system.

At step 440, multirotor device 120 releases fixed-wing aircraft 130 upon reaching the release speed. In some embodiments, multirotor device 120 and fixed-wing aircraft 130 may synchronize the release so that each device is operational to fly upon de-coupling. In some embodiments, multirotor device 120 may quickly adjust flight paths after releasing fixed-wing aircraft 130 to avoid interfering with the flight path of fixed-wing aircraft 130. After releasing fixed-wing aircraft 130, at step 450, multirotor device 120 may return to the launch site 110.

At step 460, multirotor device 120 determines whether fixed-wing aircraft 130 is returning for capture. In some embodiments, if fixed-wing aircraft 130 has not yet returned, multirotor device 120 may idle and continue to monitor whether fixed-wing aircraft 130 is ready for capture. If multirotor device 120 determines that fixed-wing aircraft 130 is ready for capture, or if multirotor device 120 receives a capture signal from fixed-wing aircraft 130 or another source the sequence may proceed to step 462.

At step 462, multirotor device 120 elevates from launch site 110 to a capture altitude. At step 464, multirotor device 120 may accelerate to a capture speed. In some embodiments, multirotor device 120 may coordinate the capture altitude and capture speed with fixed-wing aircraft 130. At step 470, multirotor device 120 may capture the fixed-wing aircraft 130. Each device may facilitate the capture sequence 212 using one or more sensors and navigation/communication equipment. In some embodiments, the capture speed and altitude may be coordinated at a remote location.

At step 480, multirotor device 120 may decelerate to a hover with captured fixed-wing aircraft 130. This may allow multirotor device 120 and fixed-wing aircraft 130 to reduce speed in a controlled manner without damaging fixed-wing aircraft 130. At step 490, multirotor device 120 may descend with captured fixed-wing aircraft 130 to launch site 110.

Various embodiments may perform some, all, or none of the steps described above. Furthermore, certain embodiments may perform these steps in a different order or in parallel. Moreover, one or more steps may be repeated. Any suitable component of system 100 may perform one or more steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method, comprising:
coupling an unmanned, multirotor helicopter to a fixed-wing aircraft;
elevating the fixed-wing aircraft from a launch site to a release altitude using the unmanned, multirotor helicopter;
accelerating the fixed-wing aircraft to a release speed using the unmanned, multirotor helicopter;
releasing the fixed-wing aircraft from the unmanned, multirotor helicopter upon reaching the release speed;

returning the unmanned, multirotor aircraft to the launch site;

elevating, the unmanned, multirotor helicopter, from the launch site and accelerating, the unmanned, multirotor helicopter;

capturing the fixed-wing aircraft using the multirotor helicopter;

decelerating the unmanned, multirotor helicopter and the captured fixed-wing aircraft to a hover; and descending the unmanned, multirotor helicopter and the captured fixed-wing aircraft to the launch site;

wherein capturing the fixed-wing aircraft further comprises:

coordinating a capture sequence between the fixed-wing aircraft and the multirotor helicopter, the capture sequence comprising:

flying the unmanned, multirotor helicopter at an elevation above the fixed-wing aircraft until the unmanned, multirotor helicopter and the fixed-wing aircraft have synchronized vectors and speeds, and then in response, descending the unmanned multirotor helicopter in elevation and connecting the fixed-wing aircraft to the unmanned, multirotor helicopter; and prior to flying the unmanned, multirotor helicopter at an elevation above the fixed-wing aircraft until the unmanned, multirotor helicopter and the fixed-wing aircraft have synchronized vectors and speeds, communicating a desired capture speed of the fixed-wing aircraft, a desired capture elevation of the fixed-wing aircraft, and a desired capture vector of the fixed-wing aircraft between the fixed-wing aircraft and the multirotor aircraft.

2. The method of claim 1, wherein accelerating the fixed-wing aircraft to a release speed using the unmanned, multirotor helicopter further comprises utilizing a propulsion system of the fixed-wing aircraft to enhance the acceleration of the unmanned, multirotor helicopter.

3. The method of claim 1, wherein upon releasing the fixed-wing aircraft, the unmanned multirotor helicopter elevates away from the fixed-wing aircraft to avoid downdraft interference with the fixed-wing aircraft.

4. The method of claim 1, wherein the unmanned multirotor helicopter is controlled by a remotely located pilot.

5. The method of claim 1, wherein elevating, accelerating, releasing, and returning are performed by the multirotor helicopter autonomously.

\* \* \* \* \*